United States Patent [19]

Fort et al.

[11] 4,021,649
[45] * May 3, 1977

[54] DATA COMPOSITING AND ARRAY CONTROL SYSTEM

[75] Inventors: J. Robert Fort; James A. Westphal, both of Altadena; Donald R. Juilfs, Chatsworth, all of Calif.

[73] Assignee: Geophysical Systems Corporation, Pasadena, Calif.

[ * ] Notice: The portion of the term of this patent subsequent to May 13, 1992, has been disclaimed.

[22] Filed: Oct. 28, 1975

[21] Appl. No.: 626,138

Related U.S. Application Data

[63] Continuation-in-part of Ser. No. 566,045, April 7, 1975, Pat. No. 3,986,008, which is a continuation of Ser. No. 358,078, May 7, 1973, Pat. No. 3,883,725.

[52] U.S. Cl. .................. 235/151.3; 340/15.5 DP; 340/15.5 CP; 340/172.5
[51] Int. Cl.² ........................................ G01V 1/28
[58] Field of Search .............. 235/151.3, 181, 152, 235/156; 340/15.5 DP, 15.5 TS, 15.5 CP, 172.5; 346/33 C

[56] References Cited

UNITED STATES PATENTS

| | | | |
|---|---|---|---|
| 3,539,985 | 11/1970 | Schneider et al. | 340/15.5 CP |
| 3,698,009 | 10/1972 | Barbier | 340/15.5 CP |
| 3,744,019 | 7/1973 | Schmitt | 340/15.5 CP |
| 3,883,725 | 5/1975 | Fort et al. | 235/151.3 |

Primary Examiner—Joseph F. Ruggiero
Attorney, Agent, or Firm—Daniel Silverman

[57] ABSTRACT

This abstract describes a system for acquisition of analog signals at a plurality of sensors, carrying these signals in groups of M channels to each of N spaced-apart array terminals, processing each signal in the array terminals by separately amplifying, digitizing to 1 bit and storing as single bit pulses, one for each channel, in a parallel to serial convertor. Each of the convertors in each of the array terminals are operatively connected in series and to an array controller, which also controls a disc magnetic recorder. On command, the convertors are read out in series as sequential trains of M bits into core memories and then stored on the disc. Successive, bit samples at subsequent digitizing intervals are stored on the disc, to form a first record. Subsequent records are processed, stored in core memory and composited with previous records stored on the disc.

7 Claims, 3 Drawing Figures

DATA COMPOSITING AND ARRAY CONTROL SYSTEM

CROSS-REFERENCE TO RELATED APPLICATIONS

This application is a continuation-in-part of copending application Ser. No. 566,045, now U.S. Pat. No. 3,986,008, Apr. 7, 1975 entitled: Data Compositing and Array Control System, which is a continuation of Ser. No. 358,078, now U.S. Pat. No. 3,883,725, filed May 7, 1973.

This application is related to three other applications assigned to the same assigneee as this application and filed on the same date as this application. The titles of the other three applications are as follows: Data Array Network System, Ser. No. 563,184 and U.S. Pat. No. 3,938,073 of Ser. No. 358,097, now U.S. Pat. No. 3,881,166; Data Acquisition and Storage system, Ser. No. 358,007; and now U.S. Pat. No. 3,930,145 Data Acquisition and Processing System, Ser. No. 358,076 U.S. Pat. No. 3,930,145 Nos. 3,883,725, 3,881,166 and Ser. No. 358,077 and 358,076 are incorporated into this application by reference.

BACKGROUND OF THE INVENTION

This invention is in the field of data acquisition and processing systems. More particularly, it is concerned with apparatus and methods for detacting analog signals at widely spaced locations, amplifying these signals and digitizing to 1 bit, and transmitting them as trains of single bit digital pulses over a single pair of conductors to a distant recording point, and compositing pluralities of said signals.

Still more particularly, it concerns a system in which a plurality of separate detectors produce analog signals which are amplified, digitized to 1 bit and transmitted by a two conductor cable to a disc recording means, and there composited with succeeding repetitions of the signals.

While this invention is useful in the acquisition of any type of analog signals such as in the field of data collection, vibration analysis, sonar signaling, nuclear technology, and so on, it is most appropriately useful in the area of seismic prospecting and as a matter of convenience, and not in any limiting way, it will be discussed in that application.

In the prior art systems the seismic signals detected by the geophones have normally been transmitted by separate pairs of conductors to the recording track. Here they are amplified in high gain, gain ranging amplifiers, multiplexed into sequential amplitude samples of successive traces, and digitized to 15 or more bits, after which they are temporarily recorded on a magnetic medium. The next repetition of the elastic wave signal is processed in a similar way and successive amplitude measurements of given traces at a given time are summed, and the sum is again recorded on the magnetic medium,

SUMMARY OF THE INVENTION

It is a primary objective of this invention to provide a data acquisition, transmission and compositing system in which a great plurality of separate geophone channels are coded and multiplexed and transmitted to a recording means, and, under control of the recording means, stored in preselected spaced locations, so that a second record can be transmitted to the recording means, added to the record previously received, and the sum record rerecorded in the same storage locations.

This and other objects are realized and the limitations of the prior art are overcome in the present invention which differs in a number of ways from the prior art systems. In particular, the plurality of seismic signals that are detected in the field are divided into groups and processed in a plurality of array terminals, by being amplified, digitized to 1 bit and stored.

In each of the plurality of array terminals there are a different plurality of geophone signals which are processed in a similar manner. The processed signals from all of the array terminals are impressed on a cable which serially passes through each of the array terminals.

This cable is connected to an array controller in the recording unit or truck. The array controller using a controller using a control pulse from the disc, sets up a timing procedure by which it initiates commands which are sent to the array terminals to provide signal processing activities.

The geophone signal is sent to a comparator amplifier. There are a plurality of these, one for each of the M geophone channels in each of the N array terminals. These comparator amplifiers can be commanded simultaneously to digitize the geophone signals to 1 bit. This produces a simultaneous plurality of short duration pulses which are either a logical 1 or 0, depending on whether the sign of the signal is plus or minus at the time of digitization of each channel. These 1 bit pulses are passed in parallel to parallel to serial convertor where they are stored. This digitizing to 1 bit process is repeated at selected intervals of time, the digitizing intervals, which may be one, two or four milliseconds, etc. apart, for example. the parallel to serial convertor is then commanded to read out the stored bits in serial order. These are read out and transmitted to the array controller on a two conductor pair, which passes serially through each of the other array terminals. All of the array terminals sequentially read out the signals stored in their convertors and send them through the next series terminal, and so on to the storage in the array controller. Thus a first sample from each trace of the entire plurality of NM traces is provided as a flow of 1 bit signals to the storage. These bits are first stored in core memory and then recorded on the disc, one in each appropriate address, which are arranged in an 8 bit spaced relation. The data are transferred from each array terminal to the array controller and to the core memories at the rate of the clock in that specific array terminal. They are then read out of core to the disc in accordance with the disc clock.

This first sequence of bits represents all of the information on all traces at the first digitizing interval. This procedure is repeated at each digitizing interval on command from the controller, until the complete signal traces for the entire group of geophones has been recorded on the disc a first record.

Next, a repetition of the elastic wave signal is impressed on the earth, and another complete set of channels are detected, amplified, digitized to 1 bit and transmitted to core memory. There is not enough space in the core memory to store a complete record. So when one bank of core is filled, the composite of previously composited records are read out of the disc to core memory. Then samples of new data and previously composited data are read out of core simultaneously, added, and then stored back on the disc in the same spaced addresses.

When the full number of repetitions of sweeps to be run are completed, and all the traces are composited, the disc is filled. The disc is then unloaded into core and then read out of core in single trace time sequential order, and sent to the processor. Thereafter, a second set of sweeps are carried out and the geophone signals are brought in and recorded on the disc, repeating the operation just described for the first set of sweeps.

Although the signals as transmitted from the array terminals to the disc are 1 bit signals, by repetition of sweeps and compositing, the words representing digitized measurements on each trace will accumulate up to 8 bits, depending on the number of repetitions, such as 256. There is provision for storage on the disc of up to 1,024 8 bit words, and similarly in the processor memory. The processor memory is now organized on a trace storage basis so that complete traces can be read out in sequence and sent to the Fast Fourier Transform box for processing by convolution, or other processes.

The present invention is concerned with the disc, the core memories and the array controller. These operate as a data compositor and array controller. On very simple infrequent commands from the computer, the array controller will provide appropriate detail commands, through a radio to the vibrator trucks, then through control wires in the array network cable, to control the signal processing in the array terminals, their digitization and storage, and sequential read out to the disc, and the processing between the disc, the core memory banks and the adder in order to do the compositing, and eventually the the read out of the composited data in trace form to the processor memory.

BRIEF DESCRIPTION OF THE DRAWINGS

These and other objects of this invention and a better understanding of the principles and details of the invention will be evident from the following description taken in conjunction with the appended drawings in which.

DESCRIPTION OF THE PREFERRED EMOBIMENTS

Figure 1:
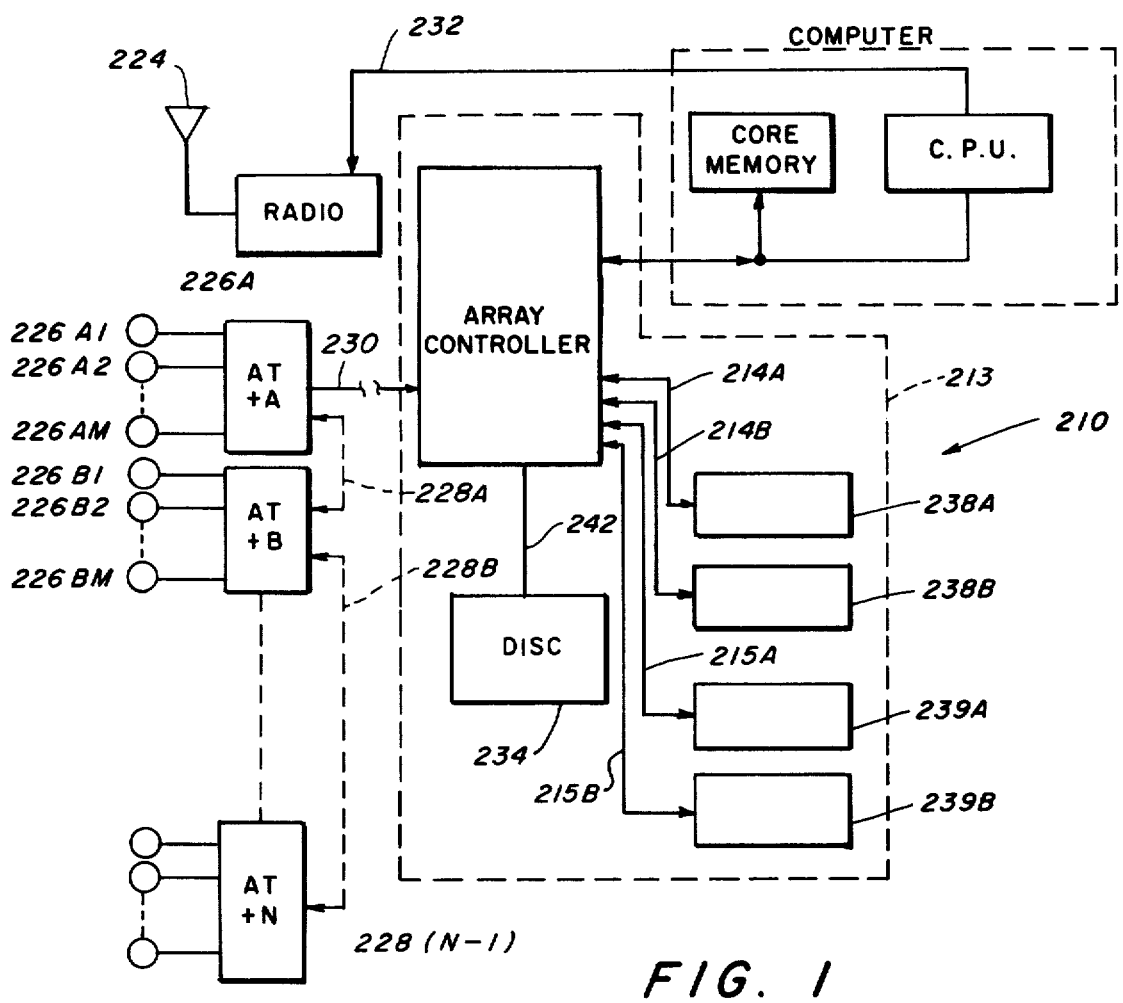
FIG. 1 is a schematic diagram of the array terminals, array cable network, the array controller, the core and disc storage systems and the computer. This is patterned after FIG. 1 of U.S. Pat. No. 3,883,725.

Reference will now be made to the drawings, and in particular, to FIG. 1. This shows in schematic form the entire system of the array controller and associated apparatus, identified by the numeral 210. This is enclosed in the dashed line 213. The heart of the system is the array controller 220 which controls magnetic disc 234 and the core memory banks 238A, 238B, 239A and 239B.

The array terminal network indicated generally by the numeral 216 is fully described in a companion copending application Ser. No. 358,077; entitled Data Acquisition Transport and Storage System, which is incorporated into this application by reference.

The geophones are arranged in groups of M geophones, there being N groups of geophones connected to a corresponding N array terminal. The geophones identified by numeral 226A1, 226A2 . . . . 226AM are connected in parallel to array terminal A, identified by numeral 226A. Similarly, geophones 226B1 to 226BM are connected in parallel to array terminal B, 226B, and so on, until geophones 226N1 to 226NM are connected in parallel to array terminal N, 226N. The array terminals are connected together by multiple conductor cables 228A, 228B, . . . .228(N-1).

The serially connected array terminals are connected by cables 230, to the recording truck and to the array controller, 220. In the cable 230 are a signal conductor pair and a plurality of control conductor pairs, which are controlled by commands from the array controller.

The procedure of operation is substantially as follows: On signal from the computer via bus 244 the array controller sets up a procedure which is in accordance with the computer instruction, of address locations, and number of sweeps and similar information. The computer sends out a signal by lead 232 to the radio 222 and antenna 224, which sends a start signal to the plurality of vibrators. The elastic wave signal from the vibrators passes through the earth and is detacted by the plurality of geophones 226.

These geophone signals after amplification, are sent to a comparator. The comparator is commanded by the array controller at selected intervals which occur at the digitizing interval, to sample and digitize each of the signals coming to the comparator. This is done by providing a high gain amplification and clipping, so that the output will be a square wave signal having the same zero axis crossings as the oringinal signal. These are connected through gates to the parallel inputs of a parallel to serial convertor. At each digitizing interval the gates are momentarily opened and each storage element receives a logical 1 or 0 dependent on whether the signal was plus or minus. These 1 or 0 bits are stored in the convertors in the convertors in each of the array terminals. The details of these steps is fully described in the copending application: Ser. No. 358,077 entitled Data Acquisition, Transport and Storage System.

At the times required for the digitizing intervals, these stored bits are read out in sequence from each array terminal and impressed on the cables 228 through the next in series terminal and so on. Thus at each digitizing interval there are NM bits serially transmitted along the cable 230 and placed on the disc in preselected address locations.

As will be described in connection with FIG. 2, there are placed on the disc, in spaced relationship, a pattern of bits at each digitizing interval a total of NM single-bit words. This is repeated at each digitizing interval until a complete record is recorded. Next a repetition sweep signal is initiated by the vibrator trucks, in response to the radio signal, and the same procedure of recording the geophone signals is carried out, providing a second complete set of bits representing a second record of NM channels. While this second record is being recorded, the previously recorded first record is read off the disc into core. These values, at the discrete digitizing intervals are summed with the corresponding incoming signal values at each digitizing time, to form a composite of the first and second records. These words are recorded back on the disc.

While each record is made up of 1 bit words, as the plurality of records are composited, the number of bits in each digitized value increases, up to a maximum of 8 bits for 256 repetitions.

These summed or composited records are stored on the disc in cross trace (or multiplexed) sequence, at each interval of time. After the disc is loaded, the data are read off the disc in a different pattern of reading, which demultiplexes the data, and converts it to trace sequence data, and sends it to the computer memory for further processing. Each of the 256 traces are then in timed sequence. They are 8 bit numbers and are ready for processing such as, for example, being passed to the Fast Fourier Transform box, where they can be filtered or any other similar operation carried out.

While we speak of specific numbers of array terminals, channels, repeated sweeps and digitizing intervals, these are only by way of example, and this invention is adapted for use in any desired configuration. As previously explained in the parent application, of which this is a continuation-in-part, the compositing of successive repetitive signals was done by controlling all of the data collection and transmission operations in synchronism with the rotation of the disc. There is a sensor which puts out a pulse at each unit rotation of the disc, corresponding to the position of an additional bit location on each of the tracks. This was used to time the commands to call for data out of the individual array terminals and to time the recording onto the disc. Also as explained in Ser. No. 566,045, now U.S. Pat. No. 3,986,008 digitized trace as it was recorded on the disc was retained in a special set of addresses capable of storing single bits. These addresses retained that series of traces until the next series of traces corresponding to the next record had been recorded, after which, the two single bit records were composited.

The purpose of retaining the current digitized record until the following one was recorded, was to retain the ability to discard that record in case it became evident that the data recorded on that was of poor quality. In the course of operation of this equipment over the extent of many hundreds of thousands of records, it became evident that this storage of a digitized record was not essential, and therefore a much simpler type of compositing was devised which is part of the invention of this application and will be described in some detail.

In the parent application, Ser. No. 566,045, it was also designed to carry the 1 bit digital signals from the array terminals directly to the array controller and to the rotating disc. The disc then was the master time controller. Because of many variables which affected this type of control, a change has been made which will be illustrated in terms of FIGS. 2 and 3. In this invention, while the disc initiates the commands to the array terminals to transmit data, the data transmitted as trains of single bit signals into the array controller are transferred at high bit speed into core memories, and are later transmitted at lower speed from the core memories into space allocations, on the various tracks of the disc. This desynchronizes the transmission of data from the array terminals to the array controller from actual storage of data on the disc. Of course, the actual placement of data into the individual addresses on the tracks from core memory is still timed by the disc clock as the disc rotates.

This arrangement of data collection and storage is illustrated in a very schematic manner in FIG. 1 by showing the data from array terminals on lead 230 passing into the array controller, and a disc 234 attached by leads 242 to the array controller, and a core memory bank comprising four separately addressable memories 238A, 239A, and 239B, 238B. These are grouped in two sets of two, that is, a 238 bank and a 239 bank. One set of these is reserved for incoming data which are transferred by the array controller from the incoming data lead 230 into one bank while previously recorded data from the disc are recalled from the disc and stored in the second bank. Corresponding data, at an individual digitizing time can be simultaneously drawn out of one bank, and the other bank, composited and then re-stored on the disc.

Figure 2:
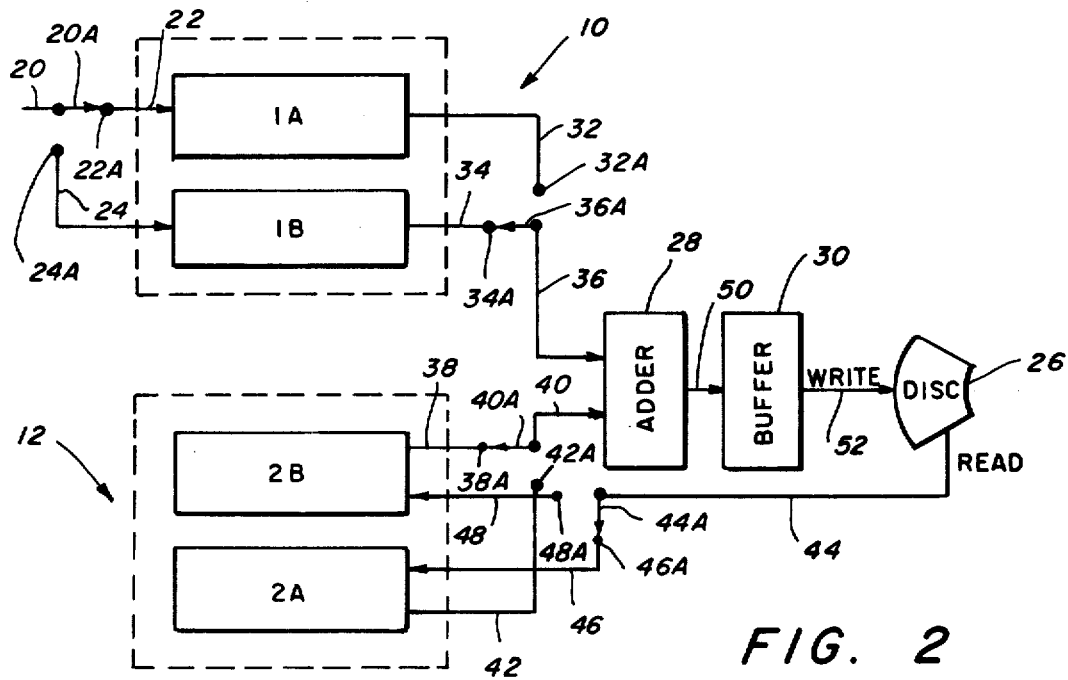
FIG. 2 is a schematic diagram of part of FIG. 1.

Referring now to FIG. 2 there is shown in schematic form, but in greater detail, the manner in which the data are composited. There are two banks of memories indicated generally by the numerals 10 and 12. One of these 10, comprises memories 14, 15. These are reserved for storage of incoming new data which come in along the line 20 and are alternately loaded into 1A and 1B in accordance with the arrows 22 and 24. These are switched by switch 20A to either 22A or 24A. There are two output leads from the core memories 1A and 2A which go by leads 32, 34 and 36 to an adder 28. Line 36 is connected through switch 36A to either 32A or 34A.

There are two other banks of core memories 2B, and 2A. These are reserved for the storage of previously recorded data, which are read out of the disc, 26 by leads 44 and are loaded aternately by leads 46 and 48 into the two memories 16 and 17. Line 44 connects through switch 44A to either 46A or 48A.

There are output leads 38, 42 and 40 which from the two banks 16 and 17 by either lead 38 or 42, and lead 40 to the adder 28. Lead 40 is switched by 40A to either 38A or 42A. The switching of the switches 20A and 36A is provided to "ping-pong" the memories. Thus while 20A is loading into 1A, 1B is unloading through 34 and 36A. Similarly, while 2A is loading through 44A, to 17, 2B is unloading through 38 and 40A.

Incoming data along line 20 will first through 20A and arrow 22 into bank 14. When this becomes filled, the incoming stream of data are then switched by the computer to line 24 for example, into the second bank 15. while the second bank 15 is being loaded the data in bank 14 are read out to the adder 28, line 50 and through a small buffer 30, and through lead 52 onto the disc 26. This is the path for the first record. On the second record while data are coming in through line 22 into bank 14, data previously composited on the disc 26 are read out through leads 44, 44A and 46 into bank 17. while this is being done previously loaded data from the disc into bank 16 and previously loaded new data in bank 15 are drawn out through leads 40 and 36 respectively into the adder 28 where they are added or composited, transmitted through leads 50 to the one word buffer 30 and through leads 52 to the disc 26.

The purpose of the one word buffer is to precisely time the flow of the composited data onto the disc. Since the data can be read out of the buffer with for more precision than the disc can be positioned. The disc clock is the source of clock signal to unload the buffer 30 onto the disc, and therefore a small one word buffer 30 is utilized. The adder is of conventional design and needs no further explanation.

Each of the banks 14, 15, 16 and 17 are comprised of 4,096 16 bit words. Each of the 16 bit words is composed of one bit each from 16 geophone circuits which are transmitted from each of the array terminals. This system of single bit digitized signals can provide great speed of transmission from a great many individual channels, without having extraordinary large memories and without being slowed down by the input-output speed of the equipment such as the disc. However, because the speed of transmission of data from array terminals to the array controller can be done so much more actual loading and unloading data from the disc the use of the core memory banks 14, 15, and 16 and 17 provides a greater efficiency of operation.

Figure 3:
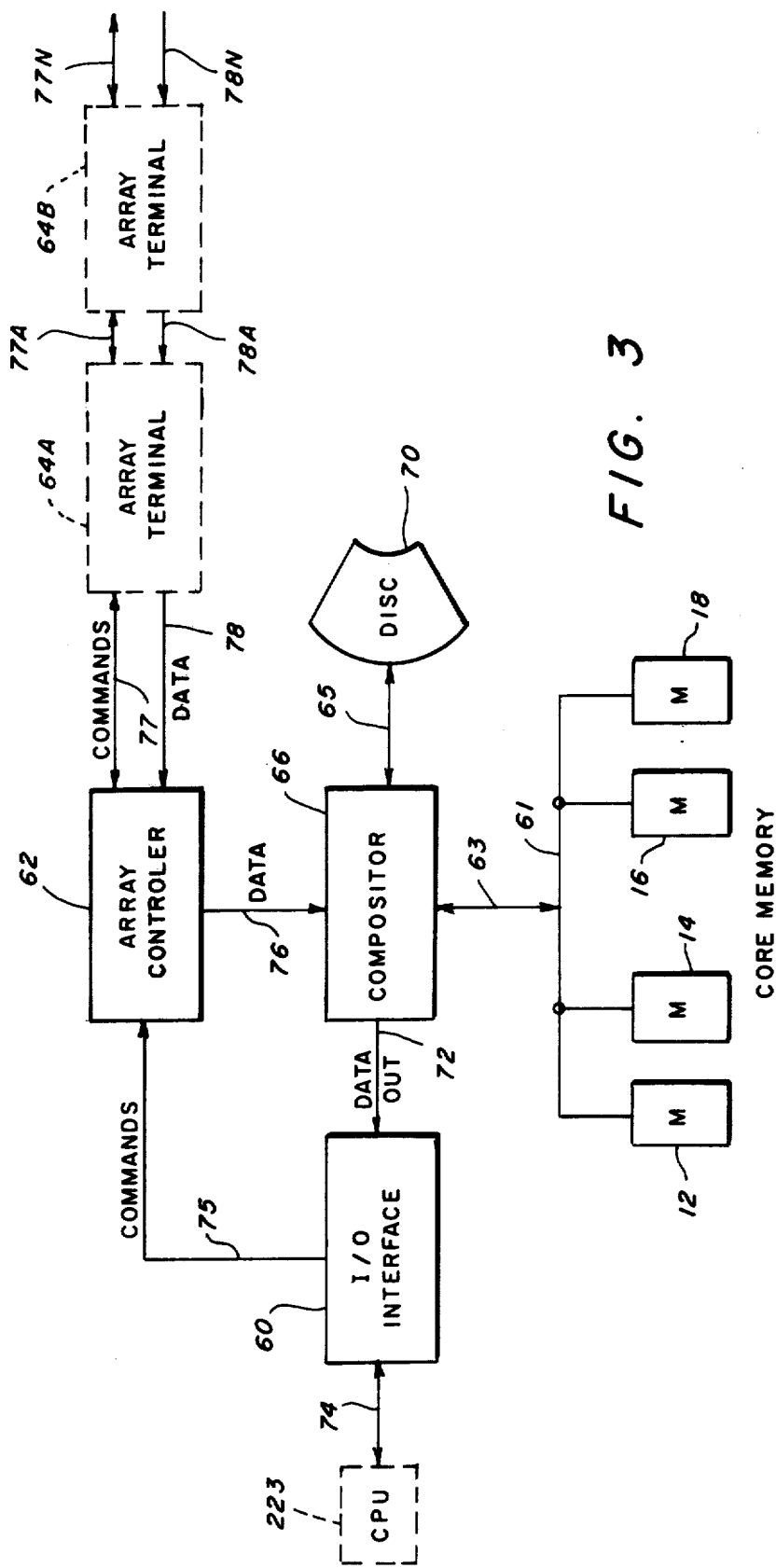
FIG. 3 is a schematic diagram of part of FIG. 1.

Referring now to FIG. 3 there is shown in somewhat more detail, although still in schematic form, the apparatus for compositing.

As shown in FIG. 1 the computer 212 contains a central processing unit C.P.U. 223 and has a working core memor 221. A bus 244 connects the computer to the array controller. In FIG. 3 this is illustrated by the arrow 74 which indicates a line of communication between the central processing unit 223 and the compositor 66. As in all computer installations, there must be an interface between the C.P.U. and the apparatus, such as the disc, and this called an Input/Output (I/O) interface 60.

Data going to the disc arrives by way of the array terminals 64A and 64B and additional terminals indicated by the arrows 77N and 78N. Commands have one line of transmission out, and in, from and to, the array controller 62. Data are transmitted inward from the most remote array terminal through terminals 64B and 64A, by means of arrows 78N and 78A and channel 78, into the array controller.

Commands to the array controller go from the C.P.U. through the interface 60, and line 75. These commands can be processed by the array controller and pass out along the series of array terminals and lines 77. In response thereto data come in in according with the arrow 78 into the array controller. The data then go from the array controller 62, which controls the compositor 66 which controls the flow of data by arrow 63 and bus 61 to and from the 4 memory banks 14, 15, 16 and 18. The compositor is also connected by lines 65 to a magnetic disc 70. Thus the data are recorded on the disc by going from the array terminals, through line 78 to the array controller, through line 76 to the compositor 66, through lines 63 and 61 to the memory. They are then drawn out of the memory by means of line 61 and 63, to the compositor 66, and then out through 65 to the disc 70.

When new data come in through the previously described route and are loaded into the memory bank, old data are read off of the disc and go by way of line 65 to compositor 66 and lines 63 and 61 to the memory bank. Then, as previously described when the banks are filled, the incoming new data, and incoming processed or stacked or composited old data, are switched to the other of each pair of banks. Then data are read out of the two banks, one containing words of previously composited data, and the other, words of the new data. They flow into the compositor, where they are added and then are buffered onto the disc 70 as shown in FIG. 2.

The detail of the array terminals and the geophones, and the manner of digitizing to 1 bit the geophone signals in the array terminals, storing them and then transmitting them serially through the array terminals to the array controller, are described in greater detail in a companion aplication, Ser. No. 358,077.

The array controller 62 is in a sense a small specialized computer which is controlled by the C.P.U. 223, and which handles operations, of which there are a great many repetitions. The programs for these are wired into the array controller, and therefore can be carried out at great speed and efficiency. Sinch the part of programming such controllers has been described in the parent application and is well-known in the art no further details of the controller 62 is necessary. A similar statement can be made for the I/O interface 60.

The storage of data on the 256 tracks on the disc 70 is a matter of programming, and since the programming of discs for the transmission of data from memory to disc, and vice versa, through the control of a C.P.U. is well-known in the art, no further information need be supplied.

The data that are transmitted into the array controller are brought in in time multiplexed form. That is, each separate sequential bit comprises one sample from one trace at one instant of time. Another train of single bit values are transmitted at the next digitizing time, and so on. It becomes important then in the programming to provide means for arranging the data in the core memory and on the disc so that the multiplex form of data coming in to the system, can be put on to the disc in multiplexed form. Later when all recordes are composited, they are to be read out through the computer to a processing apparatus in such a way that the output stream of data will give, in sequential words, the time sequential words of a single trace. Thus after the data have been composited on the disc they can be read out and back to the memory, and then read out from the memory through the compositor and through output lead 72 through the I/O interface 60 and to the C.P.U. 223, and to other apparatus, such as the Fast Fourier Transform processor, and so on.

As previously explained, the data in the core memory banks are made up of 16 bit words, which fit the size of each bank of single bit signals coming in through the array terminal. Furthermore, as the one bit signals are composited, depending on the number of traces composited, the number of bits for the words may go up to a maximum of 8 bits. Consequently, in the memory, which stores the composited data, these two 8 bit words are stored in each of the 16 bit memory locations. Thus, two words are simultaneously withdrawn from the A bank and the B bank, at each operation of compositing so that four words are withdrawn and summed and then returned to the disc, as two sum words.

In the design of this equipment and its layout in the field, there can be any number of array terminals and correspondingly any number of geophones per array terminal. However, the capability in terms of total number of channels of geophones is tied up with the size of the core memories and the disc, and so on. Consequently, there is a practical limit to the number of individual channels that can be handled on a single cable, in series, through a plurality of array terminals. For convenience, this present equipment utilizes 16 array terminals in series, each with 16 separate channels of geophones, for a total of 256 separate channels. Now, let us say the storage capability on the disc, and the processing capability, is provided for a total of 1,024 channels. It is possible therefore to have four sets of cables each with 256 channels. Or it is possible to have one single cable, comprising 64 terminals with 16 channels each, for example, or four cables each with 16 array terminals each with 16 channels. So any combination of 1,024 total channels can be provided.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. In a data recording system having a repetitive source, in which on each repetition of said source one or more analog signals are detected, amplified and digitized to 1 bit, which are stored, and said stored 1 bit signals are read out of storage at selected command intervals to form trains of single bit signals, and said trains are transmitted to a data recording means, the method the method of recording and compositing said trains of single bit signals comprising the steps of:
   a. running a rotating magnetic digital recording means at a substantially constant speed, said recording means having a plurality of spaced multi-bit storage locations;
   b. responsive to a first command producing said first train of single bit signals representative of a first source;
   c. recording in sequence, in a first digital memory each of the bits in said first train;
   d. transferring said first train of single bit signals to said rotating magnetic digital storage means in said spaced multi-bit address locations;
   e. repeating said source for a second time and responsive to a first command producing and transmitting to and recording in said first digital memory a second train of single bit digital signals representative of a second source;
   f. reading out from said rotating magnetic digital recording means said digital signals stored in said spaced locations and transferring them to a second digital memory;
   g. simultaneously reading samples of said second train of single bit signals from said first memory and said digital signals from said second memory;
   h. adding said two signals to form a sum signal; and
   i. storing said sum signals back on said rotating storage means in said spaced multi-bit locations.

2. The method as in claim 1 in which said system is a seismic geophysical system and in which said analog signals are geophone signals.

3. The method as in claim 1 in which said magnetic digital recording means comprises disc means.

4. A signal detecting, coding and multiplexing system comprising:
   a. a plurality of detectors generating analog signals representative of physical parameters, and means to amplify said analog signals at constant gain;
   b. digital storage means having a plurality of sequential multi-bit address locations;
   c. means to generate first commands at first time intervals and means responsive to said first commands to convert said analog signals to single bit digital signals, and means to store said digital signals;
   d. means to read out said stored digital signals in the form of a first train of sequential single bit signals and to transmit said signals to a recording unit;
   e. means in said recording unit to store said first train of sequential single bit signals in a first digital memory;
   f. means to transfer said single bit signals from said first digital memory to said digital storage means;
   g. means to produce and transmit to and store in said first digital memory a second train of sequential single bit signals, responsive to a second plurality of analog signals;
   h. means to withdraw from said digital storage means said digital signals stored in said sequential address locations, and to store them in a second digital memory;
   i. means to withdraw from said first and second digital memories corresponding, contemporaneous samples of said second train and said digital signals;
   j. means to add said samples of said second train and said digital signals to form sum signals; and
   k. means to record said sum signals on said digital storage means in said sequential address locations.

5. The method of detecting, digitizing to 1 bit, multiplexing and stacking a plurality of sequential analog signals from a repetitive source, comprising the steps of;
   a. operating said source for a first time'
   b. generating analog signals representative of physical parameters of the earth responsive to said first operation of said source, and amplifying said signals at constant gain;
   c. converting said analog signals to 1 bit digital signals and storing said 1 bit digital signals;
   d. reading out said stored 1 bit digital signals in the form of a first train of sequential 1 bit signals and transmitting said train of 1 bit digital signals to and storing them in a first digital memory;
   e. transferring said first train of sequential 1 bit digital signals from said first digital memory to a digital storage means having a plurality of sequential multi-bit address locations;
   f. producing, transmitting to, and storing in said first digital memory a second train of sequential single bit digital signals, responsive to a second plurality of analog signals, responsive to a second repetition of said source;
   g. withdrawing from said digital storage means said digital signals stored in said sequential multi-bit address locations, and storing them in a second digital memory;
   h. withdrawing from said first and second digital memories corresponding samples of said second train and said digital signals;
   i. adding said corresponding samples of said second train and said digital signals to form sum signals; and
   j. storing said sum signals in said digital storage means in said sequential multi-bit address locations.

6. The method as in claim 5 in which said digital storage means having sequential multi-bit address locations comprises rotating magnetic digital recording means.

7. The method as in claim 5 in which said first digital memory comprises two separate half memories, whereby when said first train of 1 bit digital signals is being transfered from a first half memory to said digital storage means, said second train of 1 bit digital signals is being stored in the second half memory of said first digital memory.

* * * * *